US012285857B2

United States Patent
Konishi

(10) Patent No.: US 12,285,857 B2
(45) Date of Patent: Apr. 29, 2025

(54) STRUCTURE OF DRIVE PORTION FOR RELATIVELY ROTATING PLURALITY OF STRUCTURE PORTIONS AND ROBOT COMPRISING JOINT PORTION

(71) Applicant: Fanuc Corporation, Yamanashi (JP)

(72) Inventor: Tomoya Konishi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 17/799,753

(22) PCT Filed: Feb. 10, 2021

(86) PCT No.: PCT/JP2021/004997
§ 371 (c)(1),
(2) Date: Aug. 15, 2022

(87) PCT Pub. No.: WO2021/166767
PCT Pub. Date: Aug. 26, 2021

(65) Prior Publication Data
US 2023/0070951 A1    Mar. 9, 2023

(30) Foreign Application Priority Data
Feb. 17, 2020    (JP) .................................. 2020-024559

(51) Int. Cl.
*B25J 9/10*    (2006.01)
*B25J 17/00*    (2006.01)

(52) U.S. Cl.
CPC    *B25J 17/00* (2013.01); *B25J 9/10* (2013.01)

(58) Field of Classification Search
CPC ..... B25J 17/00; B25J 19/0062; B25J 19/0075
See application file for complete search history.

(56) References Cited

U.S. PATENT DOCUMENTS

| 5,676,472 A | 10/1997 | Solomon et al. |
| 2011/0272895 A1* | 11/2011 | Kritzer ................ H01M 50/183 |
| | | 277/630 |

(Continued)

FOREIGN PATENT DOCUMENTS

| JP | 11254377 A | 9/1999 |
| JP | 2003172457 A | 6/2003 |

(Continued)

OTHER PUBLICATIONS

International Search Report and Written Opinion for International Application No. PCT/JP2021/004997, dated May 11, 2021, 7 pages.

*Primary Examiner* — Charles A Fox
*Assistant Examiner* — Gregory T Prather
(74) *Attorney, Agent, or Firm* — Buchanan Ingersoll & Rooney PC

(57) ABSTRACT

Provided is a structure of a joint portion which suppresses deterioration or damage of a seal member arranged inside the joint portion. The joint portion rotates a first structure portion and a second structure portion relatively to each other. The structure of the joint portion comprises: an oil seal which is arranged in a gap portion; and a labyrinth member which is arranged on outer surfaces of the first structure portion and the second structure portion. The labyrinth member comprises a passage which communicates with the gap portion. The labyrinth member is formed so as to be attachable to the outer surface of the first structure portion and the outer surface of the second structure portion. Further, the labyrinth member is formed so as to be detachable from the first structure portion and the second structure portion.

11 Claims, 15 Drawing Sheets

(56) References Cited

U.S. PATENT DOCUMENTS

| | | |
|---|---|---|
| 2017/0097046 A1 | 4/2017 | Hadden |
| 2018/0058615 A1* | 3/2018 | Kurebayashi ......... F16L 23/003 |
| 2019/0162313 A1* | 5/2019 | Bauduin ................ F16J 15/406 |

FOREIGN PATENT DOCUMENTS

| | | |
|---|---|---|
| JP | 3112976 U | 9/2005 |
| JP | 2006105297 A | 4/2006 |
| JP | 2015123549 A | 7/2015 |
| JP | 2016156478 A | 9/2016 |
| JP | 2018034268 A | 3/2018 |

* cited by examiner

STRUCTURE OF DRIVE PORTION FOR RELATIVELY ROTATING PLURALITY OF STRUCTURE PORTIONS AND ROBOT COMPRISING JOINT PORTION

CROSS REFERENCE TO RELATED APPLICATIONS

This is the U.S. National Phase application of PCT/JP2021/004997, filed Feb. 10, 2021, which claims priority to Japanese Patent Application No. 2020-024559, filed Feb. 17, 2020, the disclosures of these applications being incorporated herein by reference in their entireties for all purposes.

FIELD OF THE INVENTION

The present invention relates to a structure of a drive part for relatively rotating a plurality of structure parts and a robot including a joint.

BACKGROUND OF THE INVENTION

In the related art, an apparatus including a drive part for rotating one constituent component relative to another constituent component is known. For example, an articulated robot includes constituent components such as an arm and a wrist that are connected via a joint. The joint includes a mechanism that rotates one constituent component relative to another constituent component. A change in the orientation of the other constituent component relative to the one constituent component causes a change in the position and the orientation of a robot.

An apparatus including a drive part is used in various environments. An electric motor, a reducer, and the like for driving a constituent component are disposed inside the drive part.

Furthermore, wiring, an electronic device, and the like are disposed inside the drive part. In the drive part, a gap is formed between constituent components so that one constituent component can rotate relative to another constituent component. When foreign substances enter through this gap, the device or an electrical component disposed inside the drive part may fail. Therefore, it is preferable that the drive part has a structure for preventing foreign substances from entering the inside. Furthermore, when a fluid such as a lubricating oil is disposed inside the drive part, it is preferable to have a structure for preventing the fluid from flowing out to the outside.

In the related art, it is known that an O-ring or the like is disposed between components fixed to each other, in order to suppress foreign substances from entering the inside of the device or suppress the fluid inside the device from flowing out to the outside. Furthermore, it is known that an oil seal is disposed around a rotating component (e.g., Japanese Unexamined Patent Publication No. 11-254377 A, Japanese Unexamined Patent Publication No. 2003-172457 A, and Japanese Registered Utility Model No. 3112976 U).

PATENT LITERATURE

[PTL 1] Japanese Unexamined Patent Publication No. 11-254377 A
[PTL 2] Japanese Unexamined Patent Publication No. 2003-172457 A
[PTL 3] Japanese Registered Utility Model No. 3112976 U

SUMMARY OF THE INVENTION

Because a seal component such as the oil seal is disposed in the gap inside the drive part, it is exposed to the outside air. The seal component comes into contact with various foreign substances contained in the outside air. For example, in a robot that cleans sheet metal, food, containers, or the like, a cleaning liquid may enter the gap and reach the oil seal. When the cleaning liquid contains a chemical component for improving cleaning ability, the seal component may be deteriorated by the chemical component. Alternatively, even though the cleaning liquid is not in direct contact with the seal component, the mist of the cleaning liquid may enter the gap and may be in contact with the seal component.

Alternatively, the foreign substances reaching the seal component include a solid such as metal powder in addition to the liquid. For example, when the metal powder reaches the seal component through the gap, the metal powder may be caught between the seal component and a component in contact with the seal component. As a consequence, the seal component may be damaged.

There are various types of foreign substances. There is no seal component made of a material resistant to all types of foreign substances. Because an apparatus is used in various environments, it is necessary to select a material of the seal component according to an environment where the apparatus is used. That is, it is preferable to select a seal component made of an appropriate material for foreign substances entering the inside of the drive part.

However, the type of foreign substances reaching the seal component may change. In this case, it is necessary to be replaced with a seal component made of a material appropriate to the type of foreign substances. For example, when the type of a cleaning liquid is changed in a cleaning step, it is necessary to be replaced with a seal component made of a material that does not deteriorate against the cleaning liquid. Alternatively, it may be found that the seal component deteriorates when foreign substances come into contact with the seal component after starting the use of the apparatus.

Even in this case, it is necessary to replace the seal component.

The seal component is disposed inside the drive part. Therefore, when the seal component is deteriorated or damaged, a large amount of operation is used for replacing the seal component. Furthermore, it is necessary to stop the apparatus over a long period of time.

One aspect of the present disclosure is a structure of a drive part that relatively rotates a first structure part and a second structure part facing the first structure part. The structure of the drive part includes a seal component disposed in a gap that is a space between the first structure part and the second structure part and a passage constituent component disposed on an outer surface of at least one of the first structure part and the second structure part. The seal component is fixed to the first structure part and further is in contact with the second structure part. The gap includes an opening communicating with an outside of the drive part. The passage constituent component has a shape forming a passage communicating with the opening. The passage constituent component is formed to be attachable to at least one of the outer surfaces of the first structure part and the outer surface of the second structure part. Furthermore, the passage constituent component is formed to be detachable from the first structure part and the second structure part.

Another aspect of the present disclosure is a robot including a first constituent component including a first housing, a second constituent component including a second housing, and a joint that rotates the second constituent component relative to the first constituent component. The robot includes a passage constituent component disposed on an outer surface of the joint. The joint includes a reducer connected to an electric motor and a seal component that suppresses outflow of a lubricating oil inside the reducer. A housing of the joint is configured by at least one of the first housing and the second housing. A gap including an opening communicating with an outside of the joint is formed inside the joint. The seal component is disposed in the gap, is fixed to the first housing or a component fixed to the first housing, and is in contact with the second housing or a component fixed to the second housing. The passage constituent component has a shape forming a passage communicating with the opening. The passage constituent component is formed to be attachable to the outer surface of the joint. Furthermore, the passage constituent component is formed to be detachable from the outer surface of the joint.

According to aspects of the present disclosure, it is possible to provide a structure of a drive part that suppresses deterioration or damage of a seal component disposed inside the drive part and to provide a robot.

DETAILED DESCRIPTION OF EMBODIMENTS OF THE INVENTION

A structure of a drive part and a robot in embodiments will be described with reference to FIG. 1 to FIG. 20. In the present embodiment, as an example of an apparatus including a drive part, a robot will be described.

Figure 1:
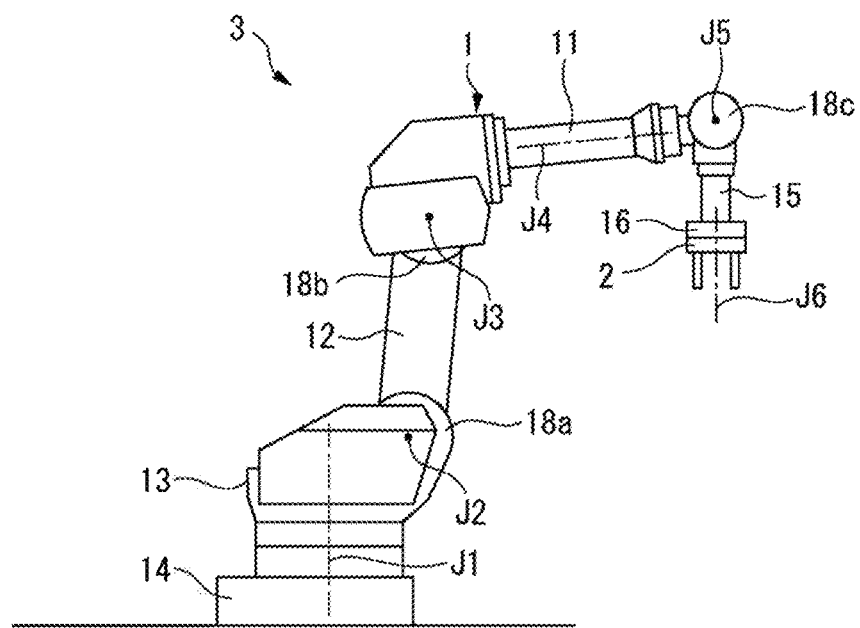
FIG. 1 is a side view of a robot apparatus in an embodiment.

FIG. 1 is a schematic view of a robot apparatus in the present embodiment. A robot apparatus 3 includes a hand 2 as an operation tool and a robot 1 that moves the hand 2. The robot 1 of the present embodiment is an articulated robot including a plurality of joints 18a, 18b, and 18c. The robot 1 includes a plurality of rotatable constituent components. The respective constituent components are formed so as to rotate about drive axes J1 to J6.

The robot 1 includes a base 14 fixed to an installation surface and a turning base 13 supported by the base 14. The turning base 13 rotates about the drive axis J1 relative to the base 14. The robot 1 includes an upper arm 11 and a lower arm 12. The lower arm 12 is supported by the turning base 13 so as to rotate about the drive axis J2. The upper arm 11 is supported by the lower arm 12 so as to rotate about the drive axis J3. Furthermore, the upper arm 11 rotates about the drive axis J4. The robot 1 includes a wrist 15 supported by the upper arm 11. The wrist 15 rotates about the drive axis J5. Furthermore, the wrist 15 includes a flange 16 that rotates about the drive axis J6. The hand 2 is fixed to the flange 16.

In this way, the robot 1 of the present embodiment includes, as constituent components, the base 14, the turning base 13, the lower arm 12, the upper arm 11, and the wrist 15. The robot of the present embodiment includes six drive axes; however, the embodiment is not limited to this. A robot that changes the position and the orientation by any mechanism can be employed. Furthermore, the operation tool of the present embodiment is a hand that grasps a workpiece; however, the embodiment is not limited to this. An operator can attach any operation tool according to the operation performed by the robot apparatus to the robot 1.

Figure 2:
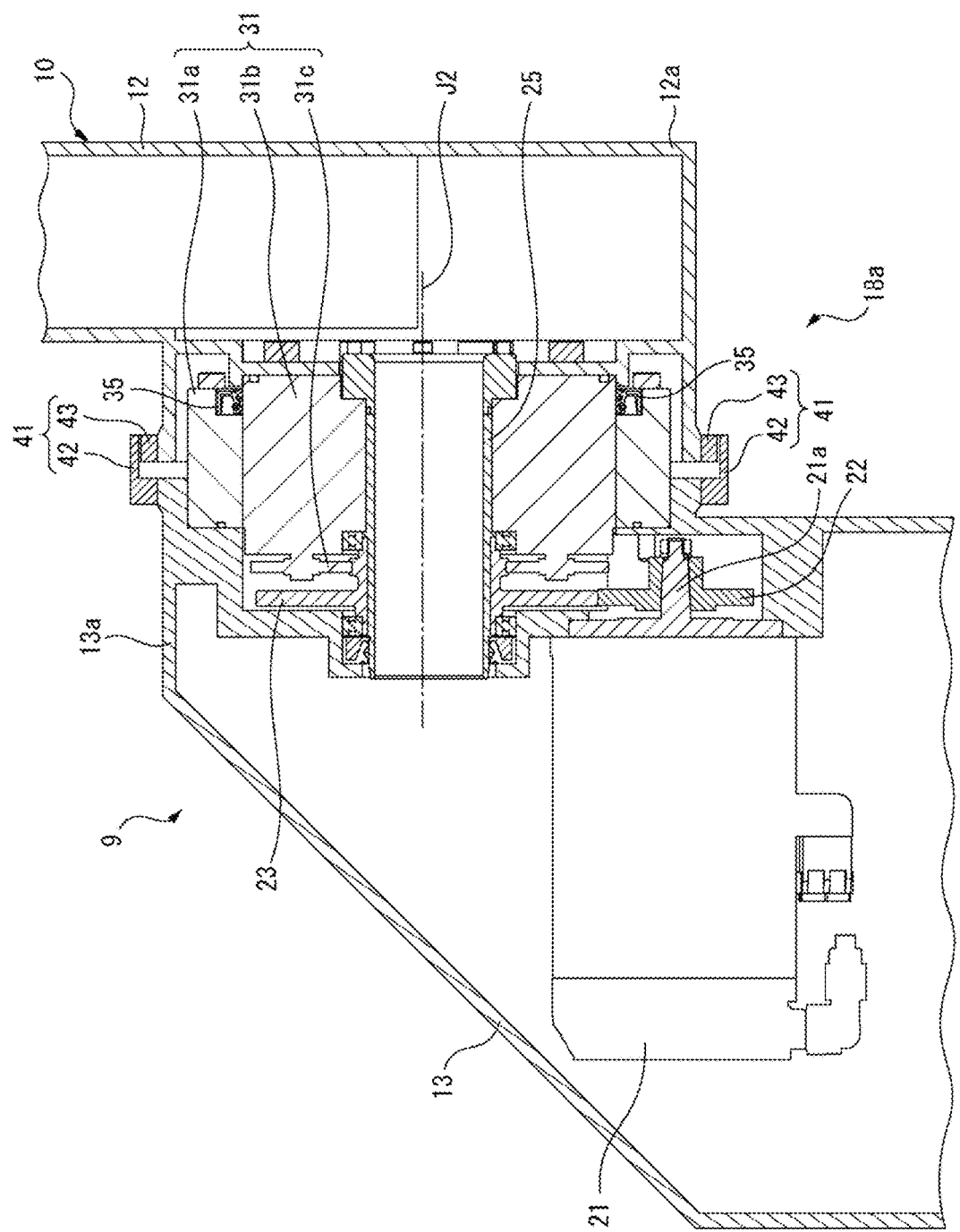
FIG. 2 is a schematic partial cross-sectional view of a joint where a first labyrinth component is disposed in an embodiment.

FIG. 2 illustrates a schematic partial cross-sectional view of the structure of a first drive part in the present embodiment. FIG. 2 is a cross-sectional view of a joint 18a as a drive part that rotates the lower arm 12 about the drive axis J2 relative to the turning base 13.

In the present embodiment, the turning base 13 serves as a first constituent component and the lower arm 12 serves as a second constituent component. The joint 18a includes an electric motor 21 for rotating the lower arm 12 and a reducer 31 connected to the electric motor 21. The turning base 13 includes a first housing 13a where the electric motor 21, the reducer 31, and the like are disposed inside. A cavity is formed inside the housing 13a. The lower arm 12 includes a second housing 12a having a cavity formed therein. An electric wire, a signal line, or the like is disposed in the cavity inside the housing 12a.

The electric motor 21 is fixed to the housing 13a of the turning base 13. The reducer 31 in the present embodiment includes a fixed part 31a fixed to the housing 13a of the turning base 13 and a movable part 31b fixed to the housing 12a of the lower arm 12. The fixed part 31a does not rotate when the lower arm 12 rotates. On the other hand, the movable part 31b rotates together with the lower arm 12.

The electric motor 21 has an output shaft 21a. The rotational force of the output shaft 21a is transmitted to a gear 31c of the movable part 31b of the reducer 31 via a gear 22 and a gear 23. A gear disposed inside the fixed part 31a and a gear disposed inside the movable part 31b are engaged with each other, so that the movable part 31b rotates relative to the fixed part 31a.

The movable part 31b is formed in a columnar shape. The fixed part 31a is formed in a cylindrical shape so as to surround the movable part 31b. A tubular component 25 is inserted into a center portion of the movable part 31b. The tubular component 25 is fixed to the housing 12a of the lower arm 12. An electric wire, a signal line, and the like are inserted into the tubular component 25.

The joint 18a as a drive part relatively rotates a first structure part and a second structure part facing the first structure part. The housing 13a of the turning base 13 and the fixed part 31a of the reducer 31 correspond to a first structure part 9. Furthermore, the housing 12a of the lower arm 12 and the movable part 31b of the reducer 31 correspond to a second structure part 10 that rotates integrally. When the rotational force of the electric motor 21 is transmitted, the second structure part 10 including the movable part 31b rotates relative to the first structure part 9 including the fixed part 31a. That is, the lower arm 12 rotates relative to the turning base 13.

Figure 3:
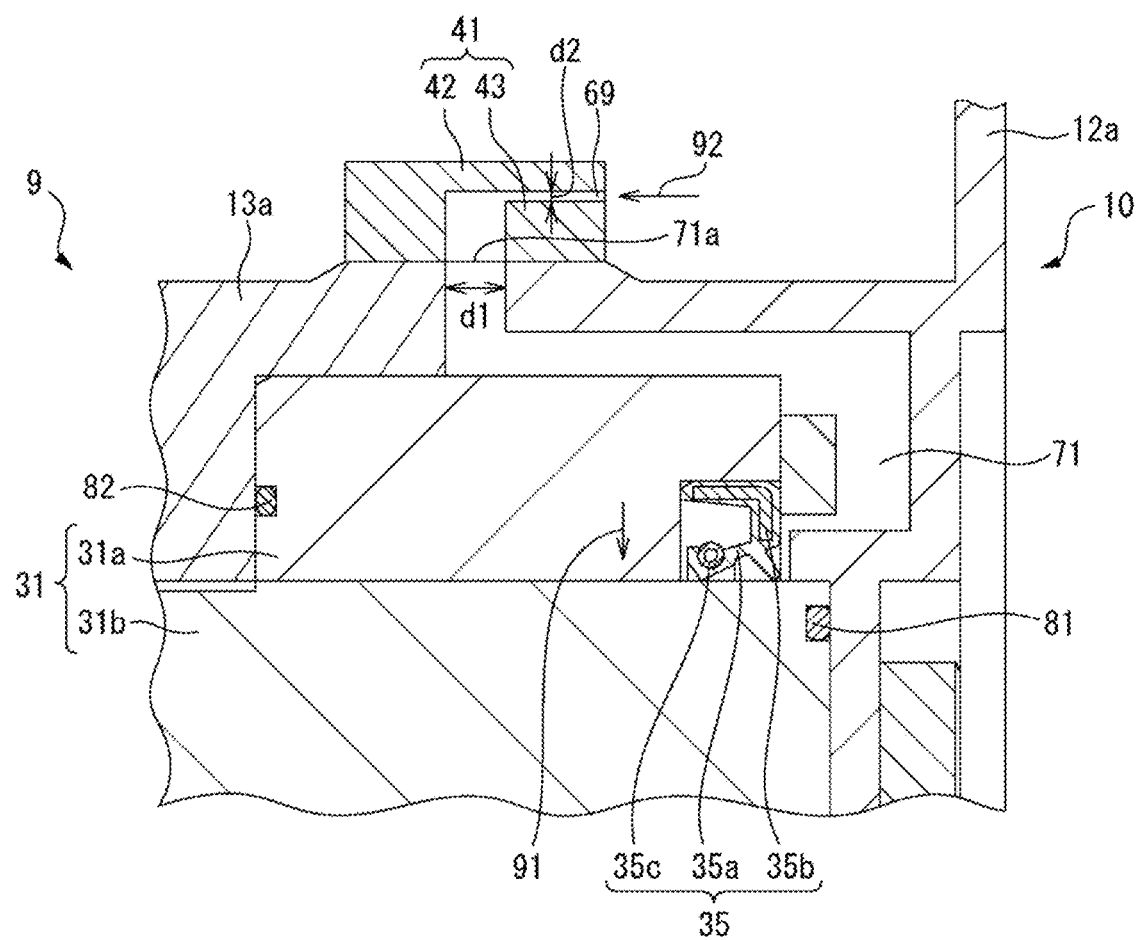
FIG. 3 is an enlarged schematic cross-sectional view of a portion where the first labyrinth component is disposed.

FIG. 3 illustrates an enlarged schematic cross-sectional view of a portion where a first labyrinth component and a seal component are disposed in the present embodiment. Referring to FIG. 2 and FIG. 3, the housing of the joint 18a is configured by the housing 13a of the turning base 13 and the housing 12a of the lower arm 12. A gap 71, which is a space between the first structure part 9 and the second structure part 10, is formed inside the joint 18a. In the structure of the first drive part, the gap 71 is configured by a space surrounded by the housing 12a, the housing 13a, and the reducer 31. The gap 71 communicates with the outside of the joint 18a through an opening 71a where the first structure part 9 and the second structure part 10 face each other.

In the structure of the first drive part, the housing 13a of the turning base 13 and the housing 12a of the lower arm 12 are formed so as to cover an outer peripheral surface of the reducer 31. In other words, the outer peripheral surface of the reducer 31 is disposed inside the housings 13a and 12a and is formed so as not to be exposed to the outside. By employing this configuration, it is possible to suppress the reducer 31 from being in contact with foreign substances such as a cleaning liquid or metal powder. A surface of the reducer 31 can be suppressed from being corroded by a chemical component contained in a liquid or damaged by a solid such as metal powder.

The joint 18a includes a seal component 82 disposed between the housing 13a and the fixed part 31a. Furthermore, the joint 18a includes a seal component 81 disposed between the housing 12a and the movable part 31b. The seal components 81 and 82 can be configured by an O-ring or the like. Furthermore, the joint 18a includes an oil seal 35 as a seal component disposed in the gap 71. The oil seal 35 suppresses a lubricating oil disposed inside the reducer 31 from flowing out to the outside of the reducer 31. The oil seal 35 of the present embodiment is disposed so as to suppress the lubricating oil from flowing out from between the fixed part 31a and the movable part 31b of the reducer 31 to the outside of the reducer 31.

The oil seal 35 in the present embodiment is formed in an annular shape so as to surround the movable part 31b. The oil seal 35 includes a lip portion 35a formed of an elastic component such as rubber and a support component 35b that supports the lip portion 35a. The support component 35b is formed of, for example, metal. The oil seal 35 has a spring 35c that presses the lip portion 35a inward in the radial direction as indicated by arrow 91.

The oil seal 35 is fixed to the fixed part 31a of the reducer 31 included in the first structure part 9. The oil seal 35 is in contact with the movable part 31b of the reducer 31 included in the second structure part 10. That is, the oil seal 35 is fixed to the fixed part 31a fixed to the first housing 13a and is in contact with the movable part 31b fixed to the second housing 12a. When the movable part 31b rotates relative to the fixed part 31a, the oil seal 35 slides on an outer peripheral surface of the movable part 31b. When the lip portion 35a is in contact with the outer peripheral surface of the movable part 31b, it is possible to suppress the lubricating oil from flowing out between the movable part 31b and the fixed part 31a.

A component where the seal component is disposed is not limited to this embodiment. For example, the oil seal can be fixed to the first housing 13a. The oil seal can be disposed so as to be in contact with the second housing 12a.

In the structure of the first drive part of the present embodiment, a first labyrinth component 41 as a passage constituent component is disposed on an outer surface of the joint 18a. The labyrinth component 41 can be attached to at least one of the first structure part 9 and the second structure part 10. The labyrinth component 41 has a shape capable of forming a passage 69 communicating with the opening 71a of the gap 71.

The labyrinth component 41 is disposed on an outer peripheral surface of the joint 18a. The first labyrinth component 41 includes a first annular component 42 formed so as to surround an outer peripheral surface of the housing 13a. The first annular component 42 is fixed to an outer surface of the housing 13a included in the first structure part 9. The first annular component 42 serves as a first facing component fixed to the first structure part 9.

Furthermore, the labyrinth component 41 includes a second annular component 43 formed so as to surround an outer peripheral surface of the housing 12a. The second annular component 43 is fixed to an outer surface of the housing 12a included in the second structure part 10. The second annular component 43 is disposed so as to face the first annular component 42. The second annular component 43 serves as a second facing component fixed to the second structure part 10.

The labyrinth component 41 includes the passage 69 communicating with the gap 71. In the first labyrinth component 41, the passage 69 is configured by a region sandwiched between the first annular component 42 and the second annular component 43. The passage 69 has a passage cross-sectional area smaller than a passage cross-sectional area of the opening 71a. In the present embodiment, a width d2 of the passage 69 is formed to be smaller than a width d1 of the opening 71a in the cross-sectional shape. The passage 69 serves as a labyrinth passage with a small passage cross-sectional area. The passage 69 may also be formed so as to have a passage cross-sectional area equal to or greater than the passage cross-sectional area of the opening 71a.

Figure 4:
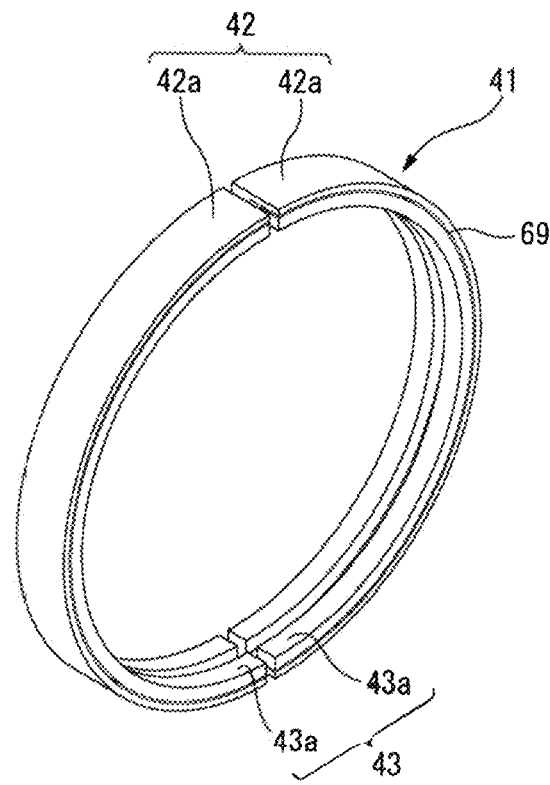
FIG. 4 is a perspective view of the first labyrinth component.
Figure 5:
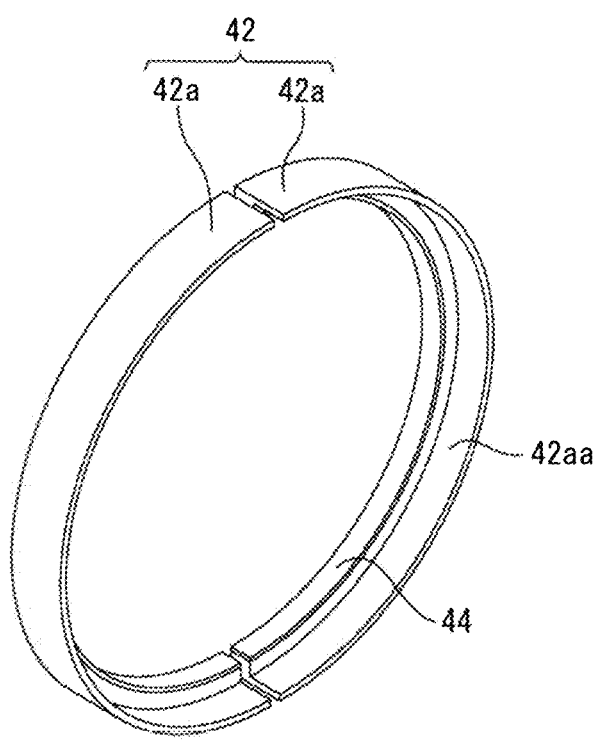
FIG. 5 is a perspective view of a first annular component of the first labyrinth component.
Figure 6:
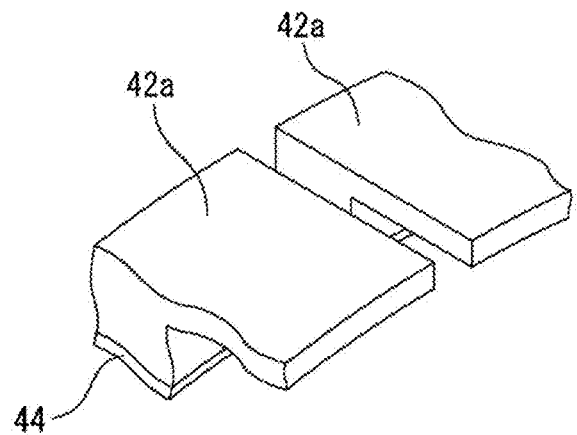
FIG. 6 is an enlarged perspective view of a portion where divided components of the first annular component are in contact with each other.

FIG. 4 illustrates a perspective view of the first labyrinth component in the present embodiment. FIG. 5 illustrates a perspective view of the first annular component of the first labyrinth component. FIG. 6 illustrates an enlarged perspective view of a portion of the first annular component where a plurality of divided components face each other. Referring to FIG. 4 to FIG. 6, the first annular component 42 is formed in a circular shape. The first annular component 42 includes a plurality of divided components 42*a* each having a side surface formed in an arc shape. The first annular component 42 is configured by the plurality of divided components 42*a* being in contact with each other.

The divided component 42*a* has a stepped portion 42*aa*. A double-sided tape 44 is disposed in a region of an inner circumferential surface of the divided component 42*a*, which excludes the stepped portion 42*aa*. The first annular component 42 is fixed to the housing 13*a* by the double-sided tape 44.

Figure 7:
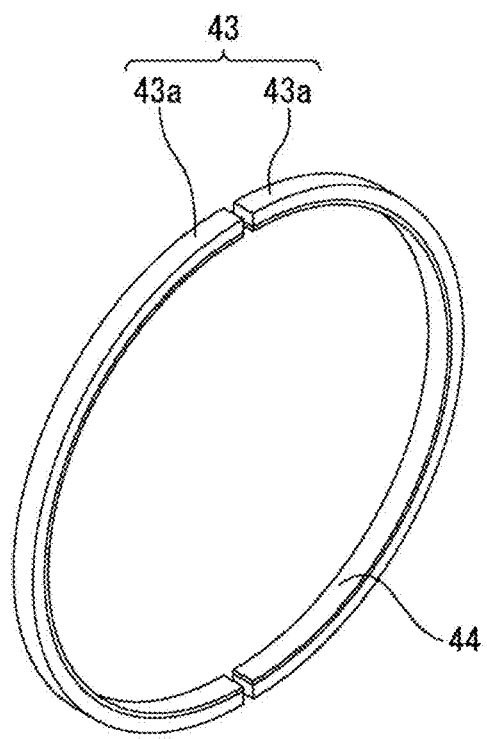
FIG. 7 is a perspective view of a second annular component of the first labyrinth component.
Figure 8:
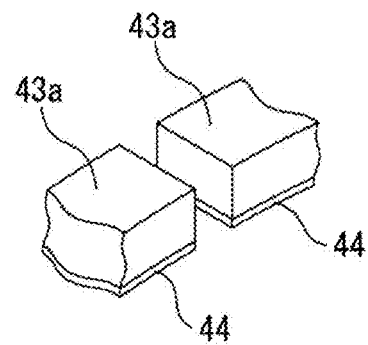
FIG. 8 is an enlarged perspective view of a portion where divided components of the second annular component are in contact with each other.

FIG. 7 illustrates a perspective view of the second annular component of the first labyrinth component. FIG. 8 illustrates an enlarged perspective view of a portion of the second annular component where a plurality of divided components face each other. Referring to FIG. 4, FIG. 7, and FIG. 8, the second annular component 43 is formed in a circular shape. The second annular component 43 includes a plurality of divided components 43*a* each having a side surface formed in an arc shape. The second annular component 43 is configured by the plurality of divided components 43*a* being in contact with each other. The double-sided tape 44 is disposed on an inner circumferential surface of the divided component 43*a*. The second annular component 43 is fixed to the housing 12*a* by the double-sided tape 44.

The divided components 42*a* and 43*a* in the present embodiment are fixed to the outer peripheral surfaces of the first housing 13*a* and the second housing 12*a*, respectively, by the double-sided tape 44. Therefore, the labyrinth component 41 can be easily attached to the outer surface of the joint 18*a* or detached from the outer surface of the joint 18*a*. The annular component of the present embodiment is configured by two divided components; however, the embodiment is not limited to this. The annular component may also include three or more divided components.

Referring to FIG. 3 to FIG. 5, the passage 69 of the labyrinth component 41 is configured by a region where the stepped portion 42*aa* of the first annular component 42 and the second annular component 43 face each other. The passage 69 is formed so as to communicate with the opening 71*a* of the gap 71.

The labyrinth component 41 is formed so as to be attachable to the outer surface of the joint 18*a*. Particularly, the labyrinth component 41 is formed so as to be attachable to the joint 18*a* after starting the use of the robot 1. Moreover, the labyrinth component 41 is formed so as to be detachable from the outer surface of the joint 18*a*. That is, the labyrinth component 41 is formed so as to be detachable from the first structure part 9 and the second structure part 10.

Figure 9:
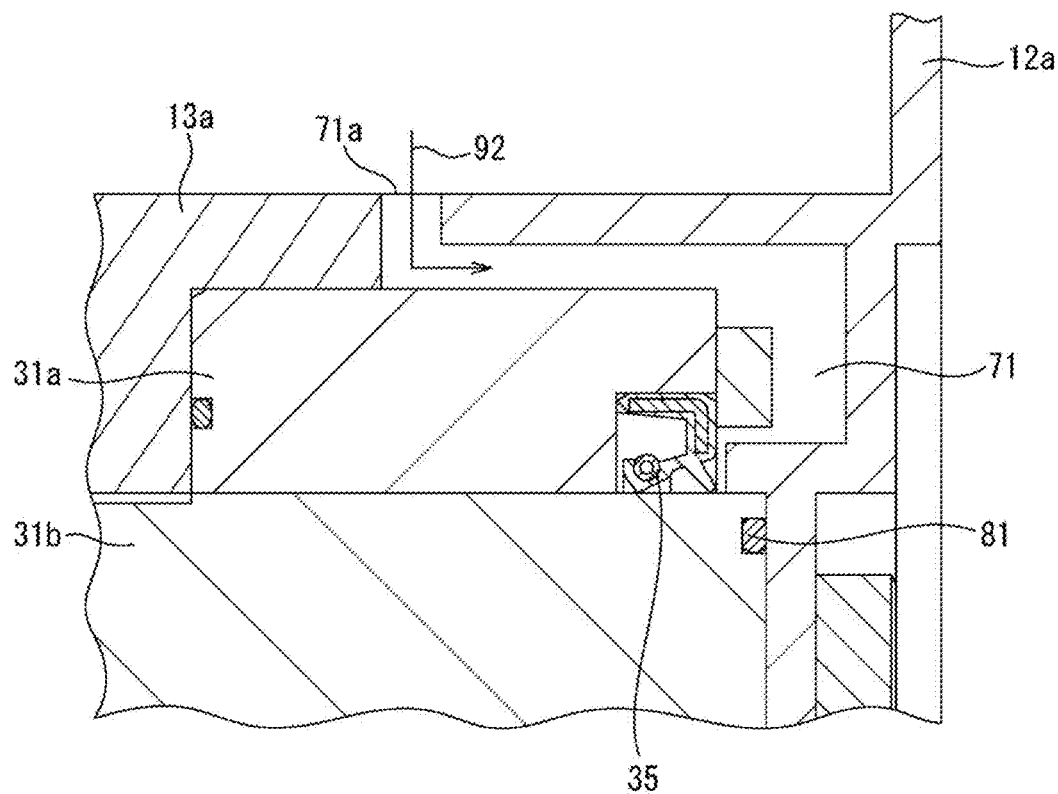
FIG. 9 is an enlarged schematic cross-sectional view of a joint of a comparative example.

FIG. 9 illustrates an enlarged schematic cross-sectional view of a joint of a robot of a comparative example. In the joint of the robot of the comparative example, the labyrinth component in the present embodiment is not disposed. Foreign substances such as a cleaning liquid and metal powder present in the outside of the robot easily enter the gap 71 through the opening 71*a* as illustrated by arrow 92. That is, the foreign substances easily reach the oil seal 35. As a consequence, the oil seal 35 may be deteriorated or damaged.

On the other hand, referring to FIG. 3, in the structure of the first drive part in the present embodiment, the first labyrinth component 41 is disposed on the opening 71*a* of the gap 71. The gap 71 is connected to the passage 69. Therefore, it is possible to suppress foreign substances from entering the passage 69 as illustrated by the arrow 92. Foreign substances such as a cleaning liquid and metal powder present in the outside of the joint 18*a* can be effectively suppressed from entering the gap 71 and reaching the oil seal 35. As a consequence, damage or deterioration of the oil seal 35 can be suppress.

In the structure of the drive part of the present embodiment, because foreign substances can be suppressed from reaching the oil seal 35, the oil seal 35 may not be formed of a material having resistance to the foreign substances entering the inside of the drive part. That is, an oil seal formed of a general-purpose material can be used without using an oil seal formed of a precious material. For example, when a cleaning liquid contains a chemical that corrodes the oil seal, a material of the oil seal can be selected without considering chemical resistance.

Furthermore, the labyrinth component 41 in the present embodiment is formed so as to be attachable to or detachable from the joint 18*a*. Particularly, after starting the use of the robot 1, it can be attached to the joint 18*a*. For example, after starting the use of the robot, when it is found that the oil seal is deteriorated by foreign substances, the labyrinth component can be attached. Furthermore, when there is a change in an environment using the robot, the labyrinth component can be attached. For example, when a cleaning liquid containing no chemical component that deteriorates the oil seal is changed to a cleaning liquid containing a chemical component that deteriorates the oil seal, the labyrinth component can be attached.

Furthermore, when the labyrinth component is not required, the labyrinth component can be detached. For example, the labyrinth component can be detached when the work of using the cleaning liquid is not performed. Alternatively, the labyrinth component can be replaced according to a change in an environment where the robot is used. For example, it can be replaced with a labyrinth component of a different material as the type of cleaning liquid changes. In this way, the labyrinth component can be attached or replaced before the seal component is deteriorated or damaged.

The passage 69 of the labyrinth component 41 in the present embodiment is formed so as to extend in a direction intersecting the direction where the gap 71 extends at the opening 71*a*. In the present embodiment, the passage 69 is formed so as to extend in a direction perpendicular to the direction where a portion communicating with the outside of the gap 71 extends. In this way, the passage 69 of the labyrinth component 41 is formed so as not to be parallel to an outlet portion of the gap 71, so that it is possible to effectively suppress foreign substances from entering the gap 71 through the passage 69.

The first labyrinth component 41 is fixed to the outer peripheral surface of the constituent component of the robot 1 by the double-sided tape 44; however, the embodiment is not limited to this. The labyrinth component may be fixed to the constituent component by using a fastening component such as a bolt.

Figure 10:
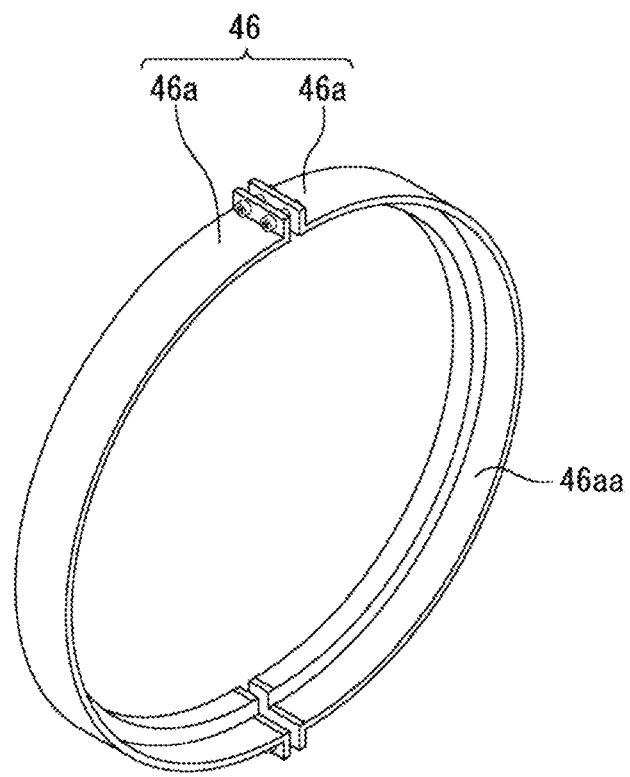
FIG. 10 is a perspective view of a first annular component of a second labyrinth component in an embodiment.
Figure 11:
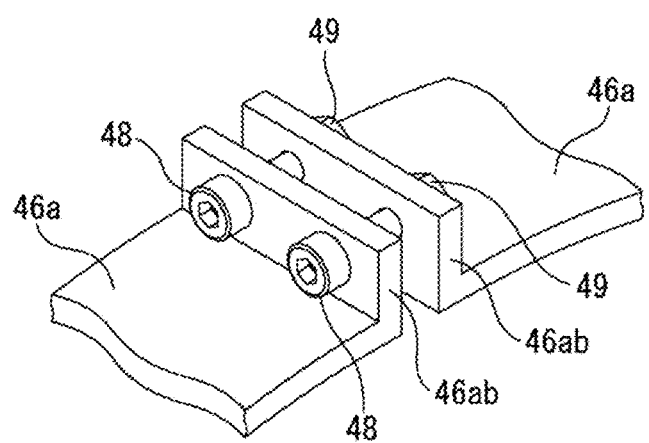
FIG. 11 is an enlarged perspective view of a portion where divided components of a first annular component are in contact with each other.

FIG. 10 illustrates a perspective view of a first annular component of a second labyrinth component in the present embodiment. FIG. 11 illustrates an enlarged perspective view of a portion, of the second labyrinth component, where divided components of the first annular component are fixed to each other. Referring to FIG. 10 and FIG. 11, the second labyrinth component includes a first annular component and a second annular component. A first annular component 46 of the second labyrinth component has a plurality of divided components 46a. The divided component 46a includes a stepped portion 46aa. Furthermore, a bending portion 46ab is formed at an end portion of the divided component 46a. The two bending portions 46ab are fixed to each other by a bolt 48 and a nut 49.

Figure 12:
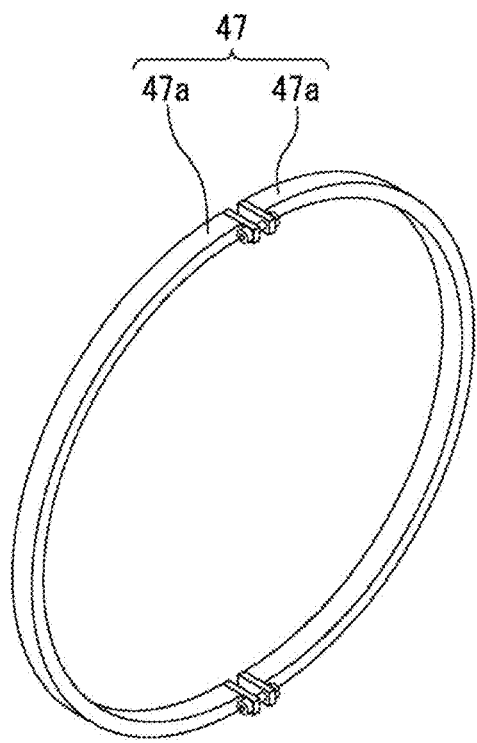
FIG. 12 is a perspective view of a second annular component of the second labyrinth component.
Figure 13:
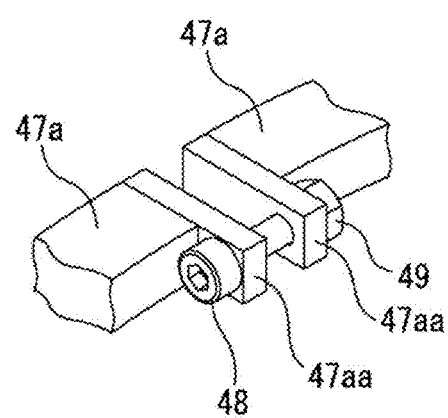
FIG. 13 is an enlarged perspective view of a portion where divided components of the second annular component are in contact with each other.

FIG. 12 illustrates a perspective view of a second annular component of the second labyrinth component in the present embodiment. FIG. 13 illustrates an enlarged perspective view of a portion of the second labyrinth component, where divided components of the second annular component are fixed to each other. Referring to FIG. 12 and FIG. 13, a second annular component 47 has a plurality of divided components 47a. The divided component 47a includes an engaging portion 47aa. The two engaging portions 47aa are fixed to each other by the bolt 48 and the nut 49.

In the second labyrinth component, after the divided components are disposed so as to sandwich the housing of the joint, the divided components are fixed to each other by the fastening component. The first annular component 46 and the second annular component 47 can be fixed to the outer peripheral surface of the constituent components of the robot 1. By tightening the bolt 48, the respective annular components 46 and 47 of the second labyrinth component can be easily fixed. Furthermore, by loosening the bolt 48, the respective annular components 46 and 47 of the second labyrinth component can be easily detached. Other structure, operation, and effect of the second labyrinth component are the same as those of the first labyrinth component.

The labyrinth component can be formed of any material. For example, the labyrinth component can be formed of resin or metal. When the labyrinth component is formed of resin, the labyrinth component can be formed by injection molding of the resin.

Furthermore, the annular component included in the labyrinth component may be formed of a deformable band-shaped component. For example, components formed of deformable metal or rubber may be fixed to the outer peripheral surface of the first housing 13a and the outer peripheral surface of the second housing 12a by a double-sided tape. Alternatively, the band-shaped component may be fixed to at least one of the first structure part 9 and the second structure part 10 by a fastening component.

Figure 14:
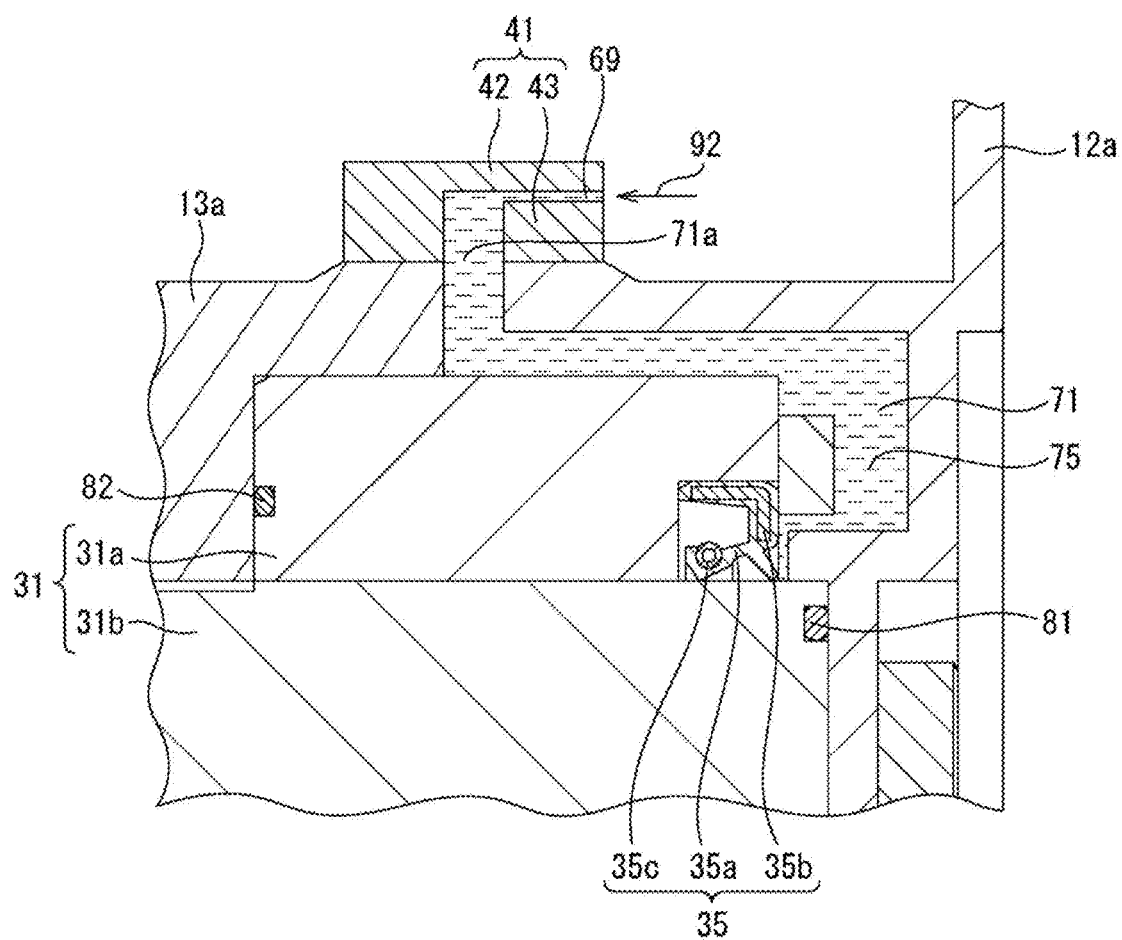
FIG. 14 is an enlarged schematic cross-sectional view of a joint whose gap is filled with grease.

FIG. 14 illustrates an enlarged schematic cross-sectional view of the structure of a second drive part in the present embodiment. In the structure of the second drive part, the gap 71 is filled with grease 75. The grease 75 is disposed in the gap 71 so as to seal a passage where foreign substances enter. This configuration can prevent foreign substances from reaching the oil seal 35. It is possible to more reliably suppress deterioration or damage of the oil seal 35.

In the example illustrated in FIG. 14, the entire gap 71 is filled with the grease 75. Furthermore, the entire passage 69 formed inside the labyrinth component 41 is also filled with the grease 75; however, the embodiment is not limited to this. The grease 75 is filled in at least a part of the gap 71 so as to block the passage from the opening 71a to the oil seal 35.

The grease 75 preferably has water resistance, which is a property of being difficult to be washed away by a liquid such as a cleaning liquid. Alternatively, the grease 75 preferably has corrosion resistance against foreign substances. However, when there is a change or the like in the type of cleaning liquid, the grease 75 may be washed away. Even in this case, the grease 75 having water resistance to a cleaning liquid can be easily filled in the gap 71. Before the oil seal 35 is deteriorated or damaged, the grease 75 can be filled or the type of grease 75 can be changed. Because other configuration, operation, and effect are the same as those of the structure of the first drive part, description thereof will not be repeated.

Figure 15:
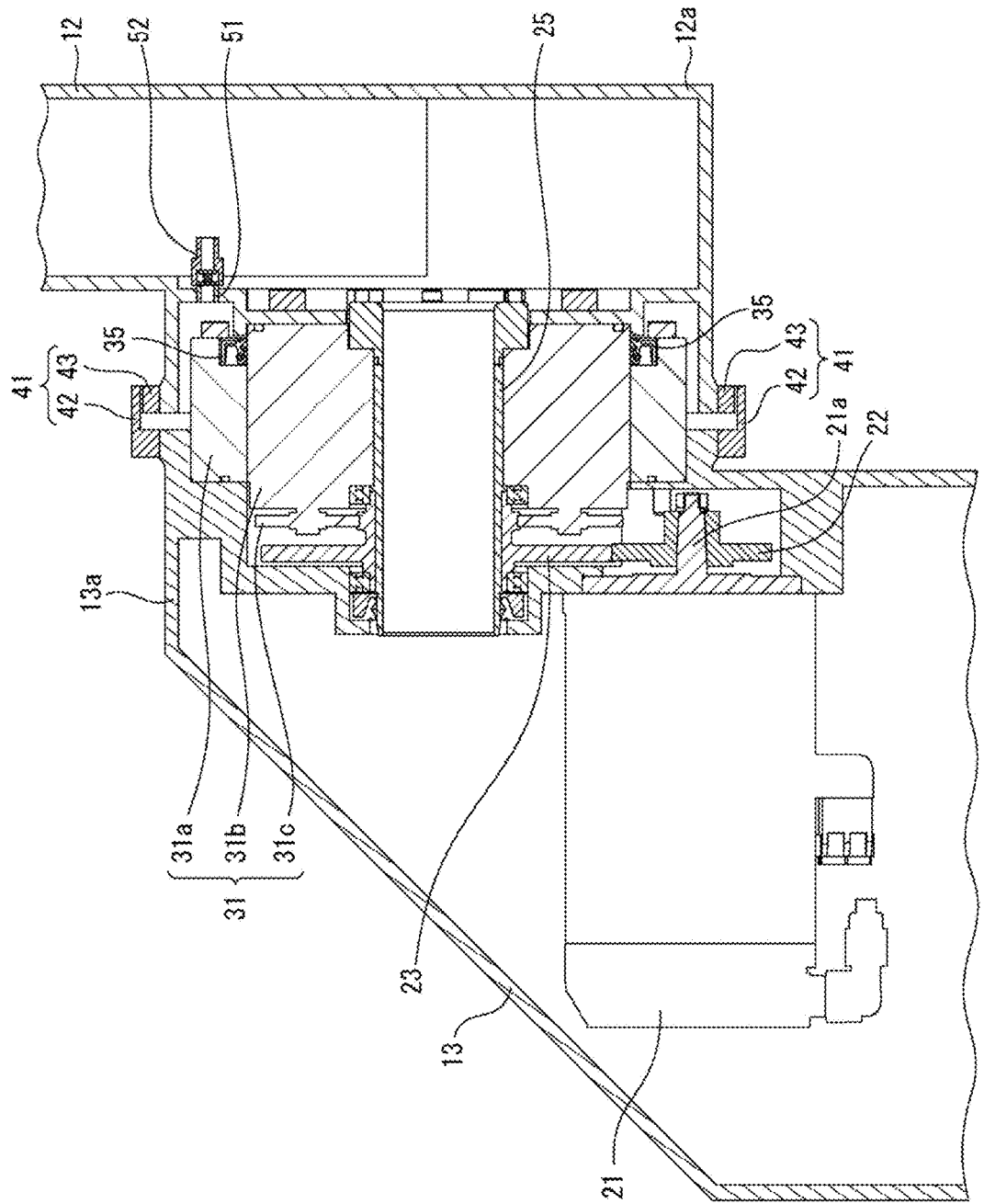
FIG. 15 is part of a schematic cross-sectional view of a joint where a gas supply valve is connected to a gap.
Figure 16:
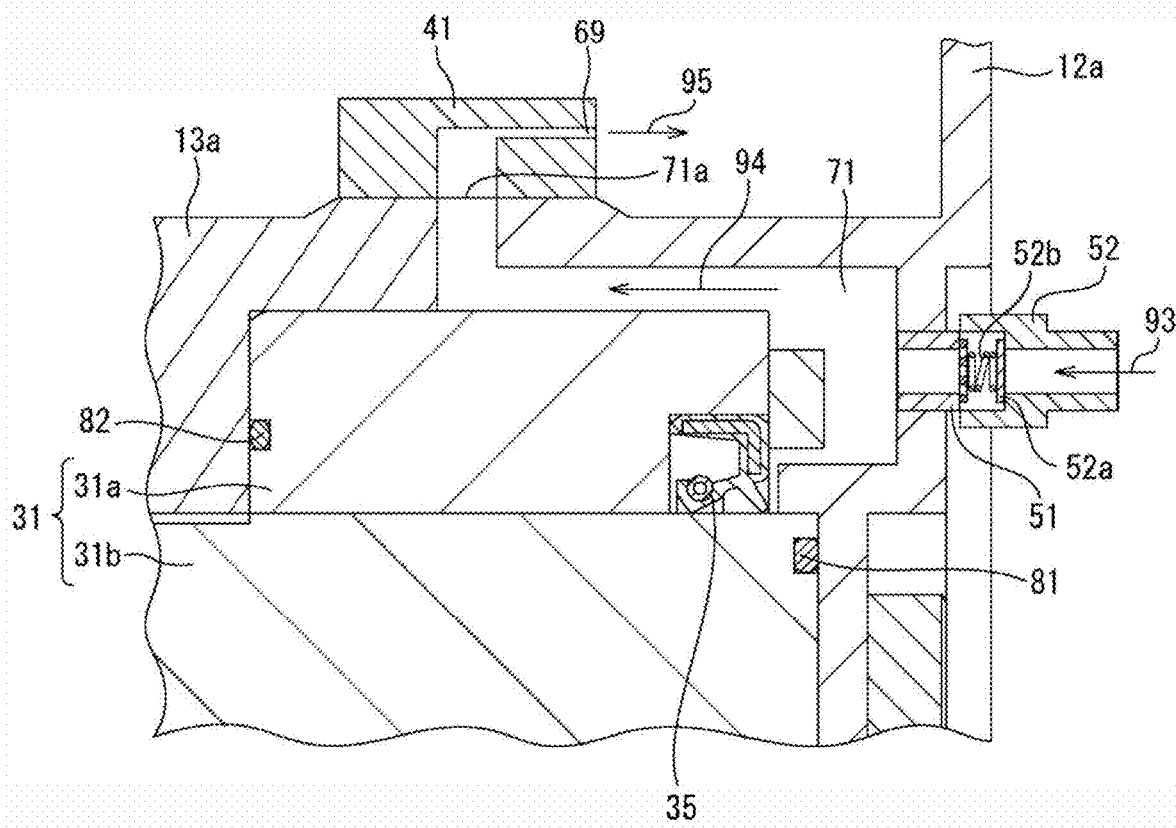
FIG. 16 is an enlarged schematic cross-sectional view of a portion where a first labyrinth component and a gas supply valve are disposed.

FIG. 15 illustrates a schematic cross-sectional view of the structure of a third drive part in the present embodiment. FIG. 16 illustrates an enlarged schematic cross-sectional view of a portion where an oil seal and a labyrinth component are disposed. Referring to FIG. 15 and FIG. 16, in the structure of the third drive part, a gas supply valve 51 communicating with the gap 71 is disposed. The gas supply valve 51 penetrates the housing 12a. The gas supply valve 51 is formed so as to supply air as a gas to the inside of the gap 71.

A check valve 52 is connected to the gas supply valve 51. The check valve 52 in the present embodiment includes a closing plate 52a urged by a spring 52b. The closing plate 52a is formed so as to open when the pressure inside the housing 12a of the lower arm 12 is higher than that of the gap 71.

The robot 1 of the present embodiment includes an air supply apparatus for supplying air to the inside of the housing 12a and the inside of the housing 13a. Pressurized air is supplied to the inside of the housing 12a and the inside of the housing 13a in order to protect devices inside the housings 12a and 13a. When the robot 1 is driven, the pressure of air inside the housing 12a and the pressure of air inside the housing 13a are higher than the atmospheric pressure. The closing plate 52a of the check valve 52 opens to form an air flow path.

As illustrated by arrow 93, air flows from the inside of the housing 12a toward the gap 71. In the gap 71, the air flows toward the labyrinth component 41 as illustrated by arrow 94. Then, as illustrated by arrow 95, the air is discharged from the passage 69 toward the outside of the labyrinth component 41. By supplying air to the inside of the gap 71 in this way, the air is discharged from the passage 69. Therefore, it is possible to effectively suppress foreign substances from entering the inside of the passage 69. It is possible to more reliably suppress the foreign substances from reaching the oil seal 35.

The apparatus for supplying air to the gap can employ any configuration. For example, a valve connected to a pump may be connected to the gas supply valve. Because other configuration, operation, and effect are the same as those of the structure of the first drive part, description thereof will not be repeated.

Figure 17:
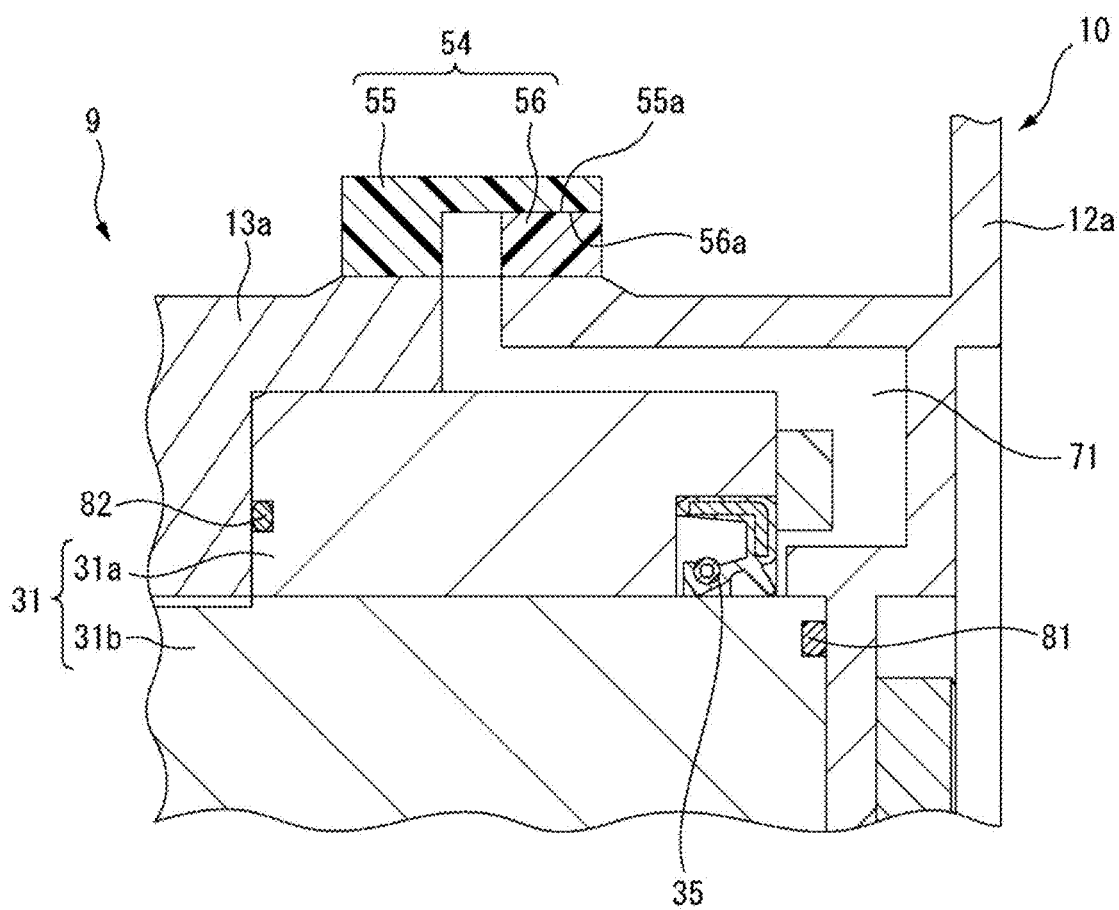
FIG. 17 is an enlarged schematic cross-sectional view of a portion where a third labyrinth component is disposed in an embodiment.

FIG. 17 illustrates an enlarged schematic cross-sectional view of the structure of a fourth drive part in the present embodiment. In the structure of the fourth drive part, a third labyrinth component 54 is disposed on the outer peripheral surface of the joint 18a. The third labyrinth component 54 includes a first annular component 55 fixed to the housing 13a and a second annular component 56 fixed to the housing 12a. By driving the joint 18a, the first annular component 55 and the second annular component 56 slide with each other. The first annular component 55 serves as a first sliding component fixed to the first structure part 9. The second annular component 56 serves as a second sliding component fixed to the second structure part 10.

In the present embodiment, the first annular component 55 and the second annular component 56 are formed of a material that abrades when they slide with each other. In the present embodiment, the annular components 55 and 56 are formed of polytetrafluoroethylene (PTFE) that is fluororesin.

FIG. 17 illustrates a state before starting the use of the joint 18a of the robot 1. A contact surface 55a of the annular component 55 and a contact surface 56a of the annular component 56 are in contact with each other. When the joint 18a is driven, the second structure part 10 rotates relative to the first structure part 9. Therefore, the annular component 56 fixed to the housing 12a rotates relative to the annular component 55 fixed to the housing 13a. The contact surface 56a slides relative to the contact surface 55a, so that the annular component 55 and the annular component 56 are abraded. As a consequence, a passage with a small passage cross-sectional area such as the passage 69 in FIG. 3 is formed between the annular component 55 and the annular component 56. In this way, a labyrinth component may be formed of a component that abrades due to the use of the drive part.

In the example illustrated in FIG. 17, a component that abrades due to sliding is disposed on the surface of each of the housings 12a and 13a; however, the embodiment is not limited to this. A component that abrades can be disposed in a portion which forms a passage in the labyrinth component. For example, referring to FIG. 3, in the first labyrinth component 41 of the present embodiment, a component that abrades due to sliding may be disposed on a surface where the first annular component 42 and the second annular component 43 face each other.

Furthermore, in the example illustrated in FIG. 17, both the annular components 55 and 56 are formed of a component that abrades due to sliding; however, the embodiment is not limited to this.

Either sliding component of the first sliding component or the second sliding component may be formed of a material that abrades. Because other configuration, operation, and effect are the same as those of the structure of the first drive part, description thereof will not be repeated.

Figure 18:
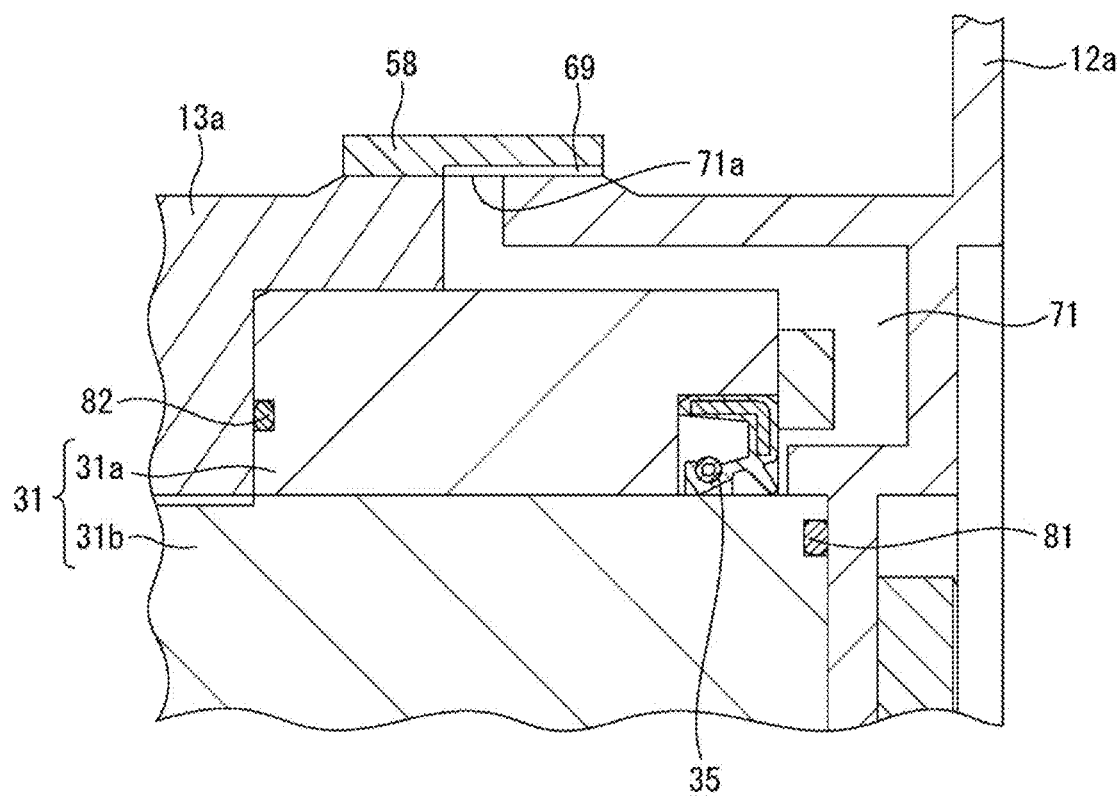
FIG. 18 is an enlarged schematic cross-sectional view of a portion where a fourth labyrinth component is disposed in an embodiment.

FIG. 18 illustrates an enlarged schematic cross-sectional view of the structure of a fifth drive part in the present embodiment. In the structure of the fifth drive part, the configuration of a labyrinth component is different from the structure of the first drive part. Referring to FIG. 3, in the structure of the first drive part, the first labyrinth component 41 is configured by a plurality of facing components facing each other. Referring to FIG. 18, in the structure of the fifth drive part, a fourth labyrinth component 58 configured by a single component is fixed to the housing 13a. The labyrinth component 58 is formed in an annular shape so as to cover the opening 71a. The labyrinth component 58 is formed so as to face the outer peripheral surface of the housing 12a. The passage 69 is formed by a region sandwiched between the surface of the labyrinth component 58 and the surface of the housing 12a.

In this way, the labyrinth component may be formed of one component. In the example illustrated in FIG. 18, the labyrinth component 58 is fixed to the first structure part 9; however, the embodiment is not limited to this and the labyrinth component 58 may be fixed to the second structure part 10. Because other configuration, operation, and effect are the same as those of the structure of the first drive part, description thereof will not be repeated.

Figure 19:
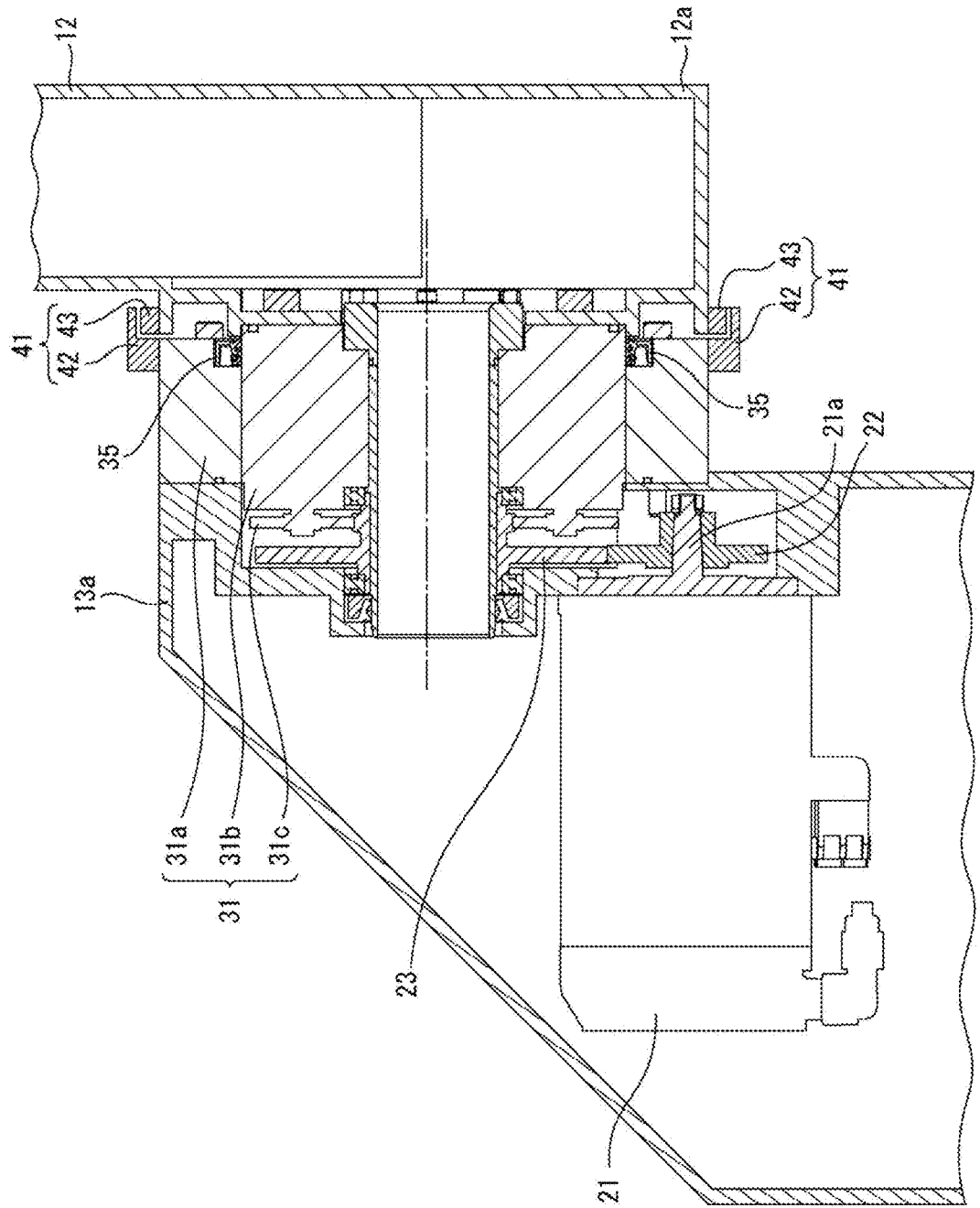
FIG. 19 is a schematic partial cross-sectional view of a joint where a first labyrinth component is disposed on an outer peripheral surface of a reducer.
Figure 20:
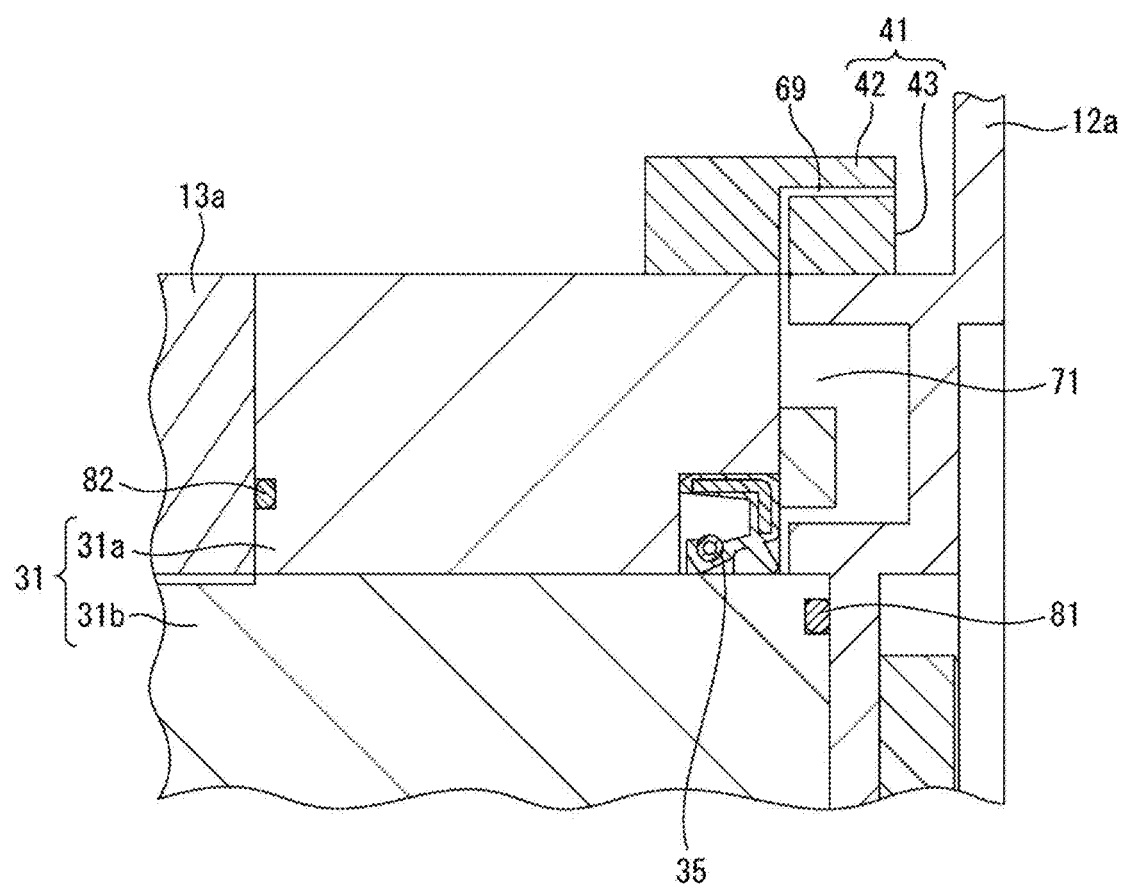
FIG. 20 is an enlarged schematic cross-sectional view of a portion where a first labyrinth component is fixed to a reducer.

FIG. 19 illustrates a schematic partial cross-sectional view of the structure of a sixth drive part in the present embodiment. FIG. 20 illustrates an enlarged schematic cross-sectional view of a portion where a labyrinth component of the structure of the sixth drive part is disposed. Referring to FIG. 19 and FIG. 20, in the structure of the sixth drive part, the reducer 31 is formed so that the outer peripheral surface thereof is exposed without being covered with the housing. The gap 71 is configured by a region surrounded by the reducer 31 and the housing 12a. A part of the labyrinth component is fixed to the outer peripheral surface of the reducer 31.

In this example, the first annular component 42 of the first labyrinth component 41 is disposed on the outer peripheral surface of the reducer 31. The first annular component 42 is fixed to the outer peripheral surface of the fixed part 31a. The second annular component 43 is fixed to the housing 12a. In this way, at least a part of the labyrinth component 41 may be fixed to the surface of the reducer 31. The structure where the passage 69 of the labyrinth component 41 is configured by a region sandwiched between the first annular component 42 and the second annular component 43, is the same as the structure of the first drive part. Because other configuration, operation, and effect are the same as those of the structure of the first drive part, description thereof will not be repeated.

In the structure of the drive part described above, the joint 18a that rotates the lower arm 12 relative to the turning base 13 is described as an example; however, the embodiment is not limited to this. The structure of the drive part described above can be applied to the structure of any joint of a robot.

In the present embodiment, a robot is exemplified and described as an apparatus including the drive part; however, the embodiment is not limited to this. As an apparatus including the drive part, any apparatus including a drive part that relatively rotates the first structure part and the second structure part facing the first structure part can be employed. Particularly, the structure of the drive part of the present embodiment is suitable for an apparatus where foreign substances may enter a gap between the first structure part and the second structure part. For example, the structure of the drive part of the present embodiment can be applied to a drive part of a machine tool, a drive part of a convey apparatus, or the like.

The above embodiment can be modified as appropriate. In each of the above-described drawings, the same or equivalent parts are denoted by the same reference numerals. It should be noted that the above-described embodiment is an example and does not limit the invention. In addition, the embodiment includes modifications of the embodiment described in the claims.

REFERENCE SIGNS LIST 1 robot
9 first structure part
10 second structure part
12 lower arm
12a housing
13 turning base
13a housing
18a, 18b, 18c joint
19 upper component
20 lower component
21 electric motor
31 reducer
31a fixed part
31b movable part
35 oil seal
37 seal component
41 labyrinth component
42, 43, 46, 47 annular component
42a, 43a, 46a, 47a divided component
44 double-sided tape
48 bolt
49 nut 51 gas supply valve
54 labyrinth component
55, 56 annular component
55a, 56a contact surface
58 labyrinth component
59 labyrinth component
60, 61 linear component
69 passage
71, 72 gap
71a opening
75 grease

The invention claimed is:

1. A structure of a drive part configured to relatively rotate a first structure part and a second structure part facing the first structure part, the structure of the drive part comprising:
the first structure part;
the second structure part;
an electric motor rotating at least one part selected from a group of the first structure part and the second structure part,
a seal component disposed in a gap, the gap being a space between the first structure part and the second structure part; and
a passage constituent component disposed on an outer surface of the first structure part and the second structure part; wherein
the seal component is fixed to the first structure part and further is in contact with the second structure part,
the gap is configured to communicate with an outside of the drive part through an opening where the first structure part and the second structure part face each other,
the passage constituent component has a shape forming a passage communicating with the opening,
the passage constituent component is formed to be attachable to the outer surfaces of the first structure part and the outer surface of the second structure part and further formed to be detachable from the first structure part and the second structure part so that the electric motor rotates the first structure part relative to the second structure part in a detached state,
the passage constituent component includes a first facing component fixed to the first structure part and a second facing component fixed to the second structure part and disposed for facing the first facing component,
the passage is configured by a region sandwiched between the first facing component and the second facing component,
the first facing component and the second facing component are configured to be detached from the first structure part and the second structure part in the detached state so that the electric motor rotates the first structure part relative to the second structure part in the detached state.

2. The structure of the drive part according to claim 1, wherein
the passage constituent component includes a first sliding component fixed to the first structure part and
a second sliding component fixed to the second structure part,
at least one sliding component of the first sliding component and the second sliding component is formed of a material abrading by the first sliding component and the second sliding component being slid against each other, and
before starting use of the drive part, the first sliding component and the second sliding component are in contact with each other, and when the drive part is started for using, at least one of the first sliding component and the second sliding component is abraded and the passage is formed.

3. The structure of the drive part according to claim 1, further comprising grease having water resistance, wherein the grease is filled in the gap.

4. The structure of the drive part according to claim 1, further comprising a gas supply valve configured to communicate with the gap and to supply gas into the gap, wherein
the gas supplied from the gas supply valve is discharged to an outside of the passage constituent component through the gap and the passage.

5. The structure of the drive part according to claim 1, wherein the passage is formed so as to extend in a direction intersecting a direction of the gap extending at the opening.

6. The structure of the drive part according to claim 1, wherein the passage constituent component is fixed to at least one of the first structure part and the second structure part by a fastening component or a double-sided tape.

7. A robot comprising:
a first constituent component including a first housing;
a second constituent component including a second housing;
a joint configured to rotate the second constituent component relative to the first constituent component; and
a passage constituent component disposed on an outer surface of the joint; wherein
the joint includes an electric motor, a reducer connected to the electric motor, and a seal component configured to suppress outflow of a lubricating oil inside the reducer,
the electric motor rotates at least one part selected from a group of the first constituent component and the second constituent component,
a housing of the joint is configured by the first housing and the second housing,
a gap is formed inside the joint and configured to communicate with an outside of the joint through an opening where the first housing and second housing face each other,
the seal component is disposed in the gap, is fixed to the first housing or a component fixed to the first housing, and is in contact with the second housing or a component fixed to the second housing,
the passage constituent component has a shape forming a passage communicating with the opening,
the passage constituent component is formed to be attachable to the outer surface of the joint and further formed to be detachable from the outer surface of the joint so that the electric motor rotates the first constituent component relative to the second constituent component in a detached state,
the first housing and the second housing are formed so as to cover an outer peripheral surface of the reducer,
the passage constituent component includes a first annular component fixed to an outer peripheral surface of the first housing and a second annular component fixed to the second housing,
the passage is configured by a region sandwiched between the first annular component and the second annular component,
the first annular component and the second annular component are configured to be detached from the first housing and the second housing in the detached state so that the electric motor rotates the first constituent component relative to the second constituent component in the detached state.

8. The robot according to claim 7, wherein an outer peripheral surface of the reducer is formed to be exposed, the passage constituent component includes a first annular component fixed to the outer peripheral surface of the reducer and a second annular component fixed to the second housing, and the passage is configured by a region sandwiched between the first annular component and the second annular component.

9. The robot according to claim 7, wherein each of the first annular component and the second annular component is formed in a circular shape, each of the first annular component and the second annular component includes a plurality of divided components, a side surface of each of the plurality of divided components being formed in an arc shape, and the plurality of divided components are fixed to each other by a fastening component.

10. The robot according to claim 7, wherein each of the first annular component and the second annular component is in a circular shape, each of the first annular component and the second annular component includes a plurality of divided components, a side surface of each of the plurality of divided components being formed in an arc shape, and the plurality of divided components are fixed, by a double-sided tape, to an outer peripheral surface of the first housing, an outer peripheral surface of the second housing, or an outer peripheral surface of the reducer.

11. The robot according to claim 7, wherein each of the first annular component and the second annular component is in a circular shape, and each of the first annular component and the second annular component is a deformable band-shaped component fixed to an outer peripheral surface of the first housing, an outer peripheral surface of the second housing, or an outer peripheral surface of the reducer.

* * * * *